(12) United States Patent
Kim

(10) Patent No.: US 9,604,692 B1
(45) Date of Patent: Mar. 28, 2017

(54) HANDS-FREE BALANCING SCOOTER STEERED TWISTEDLY WITH FEET

(71) Applicant: ROBO3 Co., Ltd., Seoul (KR)

(72) Inventor: Joon-Hyung Kim, Seoul (KR)

(73) Assignee: ROBO3 CO., LTD., Nonhyeon-Ro, Gangnam-Gu, Seoul (KR)

( * ) Notice: Subject to any disclaimer, the term of this patent is extended or adjusted under 35 U.S.C. 154(b) by 0 days.

(21) Appl. No.: 15/047,059

(22) Filed: Feb. 18, 2016

(30) Foreign Application Priority Data

Jan. 14, 2016 (KR) ........................ 10-2016-0004736

(51) Int. Cl.

| | | |
|---|---|---|
| *B62D 51/00* | (2006.01) | |
| *B62D 51/02* | (2006.01) | |
| *B62K 11/00* | (2006.01) | |
| *B62K 23/08* | (2006.01) | |
| *B62K 3/00* | (2006.01) | |
| *B62D 11/02* | (2006.01) | |
| *B62K 11/14* | (2006.01) | |

(52) U.S. Cl.
CPC .............. *B62K 23/08* (2013.01); *B62D 11/02* (2013.01); *B62D 51/001* (2013.01); *B62D 51/02* (2013.01); *B62K 3/007* (2013.01); *B62K 11/007* (2016.11); *B62K 11/14* (2013.01)

(58) Field of Classification Search
CPC ...... B62D 51/02; B62K 11/007; B62K 21/00; B62K 3/002; B62K 3/007; B62K 17/00; B60L 15/34; B60L 15/2036; B60L 2200/16; B60L 15/2009; G05G 1/30; G05G 1/34; H01H 3/14; H01H 3/141; A63C 17/011; A63C 17/12; A63C 17/01; A63C 17/08

See application file for complete search history.

(56) References Cited

U.S. PATENT DOCUMENTS

| | | | | |
|---|---|---|---|---|
| 4,295,385 A | * | 10/1981 | Huttenhow | ............... G05G 1/30 114/160 |
| 4,445,699 A | * | 5/1984 | Darasko | ............... A63C 17/045 280/11.223 |
| 4,527,983 A | * | 7/1985 | Booth | .................. B63H 20/007 114/153 |

(Continued)

FOREIGN PATENT DOCUMENTS

| | | | |
|---|---|---|---|
| JP | 2015140177 A | * | 8/2015 |
| KR | 10-1529971 B1 | | 6/2015 |

*Primary Examiner* — Joseph Rocca
*Assistant Examiner* — Daniel Yeagley
(74) *Attorney, Agent, or Firm* — John K. Park; Park Law Firm

(57) ABSTRACT

The present invention relates to a hands-free balancing scooter steered twistedly with feet that includes: a housing; a controller mounted on the upper portion of the housing to control driving and direction changes of the balancing scooter; motors mounted on both sides of the housing and having wheels mounted on the shafts thereof; a battery mounting portion formed on the bottom surface of the housing so as to mount a battery therein; a foothold located on top of the housing to allow a rider's both feet to be stepped thereon and having a handle formed on one side thereof and two through holes formed thereon to allow manipulating rods of rotary motion sensors embedded into the housing to protrude therefrom; and turntables mounted on the foothold in such a manner as to be assembled to the manipulating rods of the rotary motion sensors.

1 Claim, 8 Drawing Sheets

(56) References Cited

U.S. PATENT DOCUMENTS

| | | | | |
|---|---|---|---|---|
| 5,505,474 A * | 4/1996 | Yeh | ............ | A63C 5/02 |
| | | | | 280/87.042 |
| 6,126,497 A * | 10/2000 | Stockton | .............. | B63H 20/007 |
| | | | | 114/144 A |
| 7,185,555 B2 * | 3/2007 | Peterson | ................... | G05G 1/30 |
| | | | | 74/512 |
| 7,703,568 B2 * | 4/2010 | Ishii | ........................ | A63C 17/12 |
| | | | | 180/218 |
| 9,393,483 B2 * | 7/2016 | Tan | ......................... | A63C 17/12 |
| 9,403,573 B1 * | 8/2016 | Mazzei | ................... | B62D 51/02 |
| 9,499,228 B2 * | 11/2016 | Chang | ................... | B62K 3/002 |
| 2004/0035621 A1 * | 2/2004 | Yu | ......................... | B62K 3/002 |
| | | | | 180/181 |
| 2004/0036247 A1 * | 2/2004 | Lee | ........................ | B62K 21/00 |
| | | | | 280/221 |
| 2005/0121238 A1 * | 6/2005 | Ishii | ........................ | A63C 17/08 |
| | | | | 180/65.1 |
| 2006/0260862 A1 * | 11/2006 | Nishikawa | .............. | B62K 17/00 |
| | | | | 180/315 |
| 2011/0303475 A1 * | 12/2011 | Kim | ...................... | B62K 11/007 |
| | | | | 180/218 |
| 2013/0032423 A1 * | 2/2013 | Chen | ................... | A63C 17/0073 |
| | | | | 180/218 |
| 2013/0206493 A1 * | 8/2013 | Larson | ................. | A63C 17/012 |
| | | | | 180/181 |
| 2013/0238231 A1 * | 9/2013 | Chen | .................... | B62K 11/007 |
| | | | | 701/124 |
| 2015/0238845 A1 * | 8/2015 | Clayton | ................. | B62K 3/002 |
| | | | | 280/87.042 |
| 2015/0298756 A1 * | 10/2015 | Takeda | ................... | B62K 3/007 |
| | | | | 180/218 |
| 2016/0129963 A1 * | 5/2016 | Ying | ...................... | B62K 3/007 |
| | | | | 180/6.5 |
| 2016/0318581 A1 * | 11/2016 | Kim | ........................ | B60L 15/20 |

* cited by examiner

- Prior Art -

- Prior Art -

HANDS-FREE BALANCING SCOOTER STEERED TWISTEDLY WITH FEET

BACKGROUND OF THE INVENTION

Field of the Invention

The present invention relates to a hands-free balancing scooter, and more particularly, to a hands-free balancing scooter steered twistedly with feet that can allow a rider's hands to be free upon the manipulations in forward and backward driving and the changes in left and right driving directions, so that if the rider wants to change the driving direction of the balancing scooter, he or she twistedly turns turntables mounted on a foothold through his or her both feet stepped on the turntables to left and right sides.

Background of the Related Art

FIG. 1 is a perspective view showing a conventional stick type balancing scooter. As shown in FIG. 1, first, the conventional stick type balancing scooter is driven with two wheels 22 disposed in left and right sides thereof, while they are keeping their balance in real time during driving. So as to maintain the balance between the two wheels 22, while various electric processors like a gyro sensor are being controlled under a controller, balancing between the two wheels 22 is maintained in real time, thus conducting forward and backward driving and left and right direction changes of the stick type balancing scooter.

As shown in FIG. 1, for example, if the rider holds manipulation handles 71 to incline his or her body forwardly to a given angle in the state of riding on the stick type balancing scooter, the inclination of his or her body is in real time read through a variety of sensors like a gyro sensor, and the two wheels 22 are driven in the direction of the inclination to offset the inclination, so that the stick type balancing scooter can change the position, while being not overturned forwardly due to the generation of the inclination, thus achieving safe driving.

Accordingly, the stick type balancing scooter can maintain its erecting state with the two wheels 22, without losing its balance, and it can be driven forwardly and backwardly according to the moving directions of the center of his or her body. As the manipulation handles 71 pull, further, the changes in the driving direction of the scooter can be achieved.

According to the conventional stick type balancing scooter, however, the rider rides on the scooter in the state of standing upright, while holding the manipulation handles 71 through his or her hands, so that, unfortunately, his or her hands are not freely used during driving. On the other hand, as shown in FIG. 1, a fixing shaft 70 is straightly disposed on the stick type balancing scooter, and the manipulation handles 71 are mounted on the upper portion of the fixing shaft 70, so that the whole volume of the stick type balancing scooter can be bulky, thus making it hard to be kept in the trunk of a vehicle.

SUMMARY OF THE INVENTION

Accordingly, the present invention has been made in view of the above-mentioned problems occurring in the prior art, and it is an object of the present invention to provide a hands-free balancing scooter steered twistedly with feet that can allow a rider's hands to be free while being driven and can change the driving direction thereof through his or her both feet stepped on a foothold in the state where his or her hands are free.

It is another object of the present invention to provide a hands-free balancing scooter steered twistedly with feet that is an improvement of a conventional backpack type self-balancing scooter having a foot-driven steering apparatus mounted thereon, which is disclosed in Korean Patent No. 1529971 issued to the same applicant as the present invention, wherein new parts are added to provide higher operating effects than those in the conventional backpack type self-balancing scooter.

To accomplish the above-mentioned objects, according to the present invention, there is provided a hands-free balancing scooter steered twistedly with feet, including: a housing; a controller mounted on the upper portion of the housing to control driving and direction changes of the balancing scooter; motors mounted on both sides of the housing and having wheels mounted on the shafts thereof; a battery mounting portion formed on the bottom surface of the housing so as to mount a battery therein; a foothold located on top of the housing to allow a rider's both feet to be stepped thereon and having a handle formed on one side thereof and two through holes formed thereon to allow manipulating rods of rotary motion sensors embedded into the housing to protrude therefrom; and turntables mounted on the foothold in such a manner as to be assembled to the manipulating rods of the rotary motion sensors, wherein if it is desired to change the driving direction of the balancing scooter, the rider's both feet twistedly turn the turntables in the state where they are brought into contact with the turntables.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
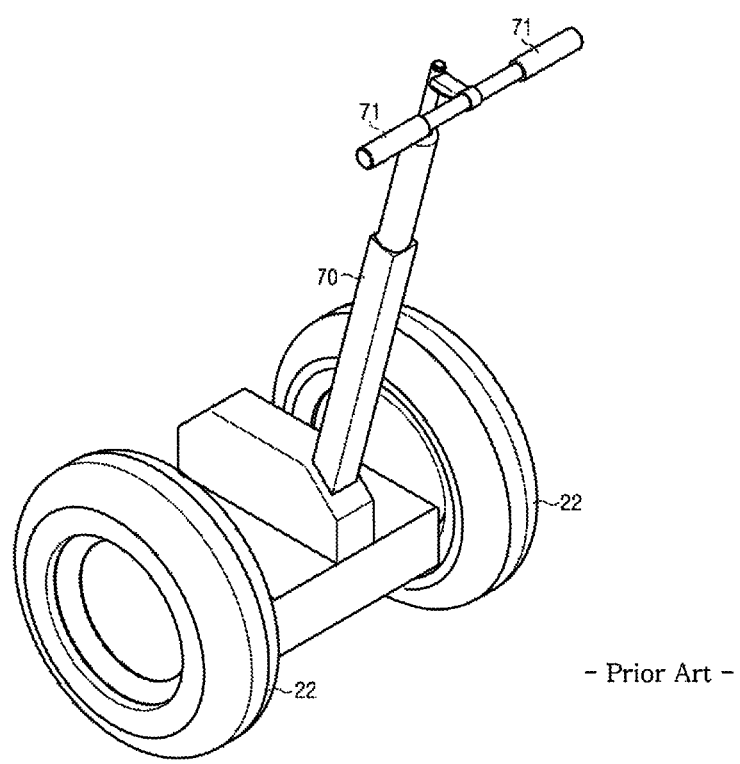
FIG. 1 is a perspective view showing a conventional stick type balancing scooter.

Hereinafter, an explanation on a hands-free balancing scooter steered twistedly with feet according to the present invention will be in detail given with reference to the attached drawing. The present invention will be explained in comparison with a conventional hands-free balancing scooter as will be discussed below, and the same parts as the conventional hands-free balancing scooter will be indicated by the identical reference numerals.

Figure 2:
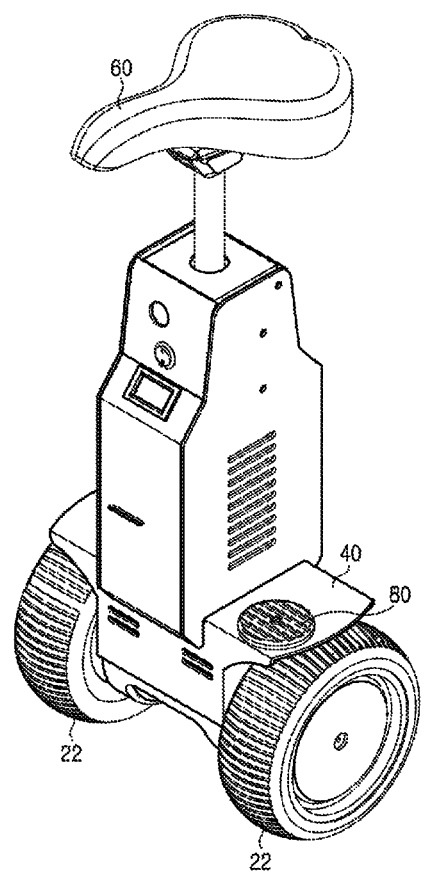
FIG. 2 is a perspective view showing a conventional hands-free balancing scooter.

FIG. 2 is a perspective view showing a conventional hands-free balancing scooter, which is disclosed in Korean Patent No. 1529971 entitled "backpack type self-balancing scooter having foot-driven steering apparatus mounted thereon" and issued to the same applicant as the present invention, so as to solve the problems occurring in the conventional stick type balancing scooter of FIG. 1 as mentioned above.

That is, the stick type balancing scooter as shown in FIG. 1 is configured wherein the rider stands upright on the scooter, while holding the manipulation handles 71, and next, his or her body is inclined to drive the scooter. Further, he or she should turn the manipulation handles 71 through his or her hands so as to change the driving direction of the scooter. Accordingly, unfortunately, his or her hands are not free during driving.

The conventional backpack type self-balancing scooter having a foot-driven steering apparatus mounted thereon, as shown in FIG. 2, is configured wherein a rider's hands are relatively free than those in the conventional stick type balancing scooter as shown in FIG. 1 and further, the left and right driving directions of the scooter are changed through the rider's one foot. In this case, the scooter is rotated to the left and right sides through the pressing force applied to the steering apparatus on which the rider's one foot is stepped.

While the rider is sitting on a saddle 60, accordingly, he or she drives the scooter conveniently, and further, the left and right directions of the scooter can be manipulated through the pressing force applied to a shuttle ring 80 mounted on a foothold 40, on which the rider's one foot is stepped, so that the rider's hands are free during the driving.

While the conventional backpack type self-balancing scooter is being driven, accordingly, the rider may take a picture, hold objects with his or her hands, or use his or her hands freely. Even if the rider has disabilities in hands, further, the conventional backpack type self-balancing scooter can be driven only with the inclination of his or her body, and also, the shuttle ring 80 is manipulated as his or her one foot is turned to the left or right side, so that the self balancing scooter can be driven easily even by the rider with disabilities in hands.

In spite of the excellent advantages as mentioned above, however, the conventional backpack type self-balancing scooter should move the shuttle ring 80 to the left and right sides in the state where the heel of the rider's one foot stepped on the shuttle ring 80 is raised, so that load is applied to the other foot to cause balancing of his or her both feet stepped on the foothold 40 to be lost, thus making it hard to manipulate the shuttle ring 80.

Additionally, the heel of the rider's one foot stepped on the shuttle ring 80 should be raised whenever the direction changes are needed, so that his or her psychological balance may be lost. Accordingly, even if the rider's hands are free during driving, the difficulties in the driving actually appear.

When the rider rides the balancing scooter, in more detail, psychological and technological load is applied to him or her even during straight driving because the balancing scooter is driven through the movement of the center of his or her body. Accordingly, it is hard to conduct the straight driving at an initial driving step. In the initial driving step, further, the direction changes occurring by raising the heel of his or her one foot may cause his or her both feet to be unbalanced and also give bad influences to his or her psychological state, so that he or she feels like that the scooter is overturned while driven, thus making it hard to drive the scooter, and if he or she rides the scooter for long hours, his or her fatigue becomes increased due to the unbalancing of his or her both feet.

Figure 3:
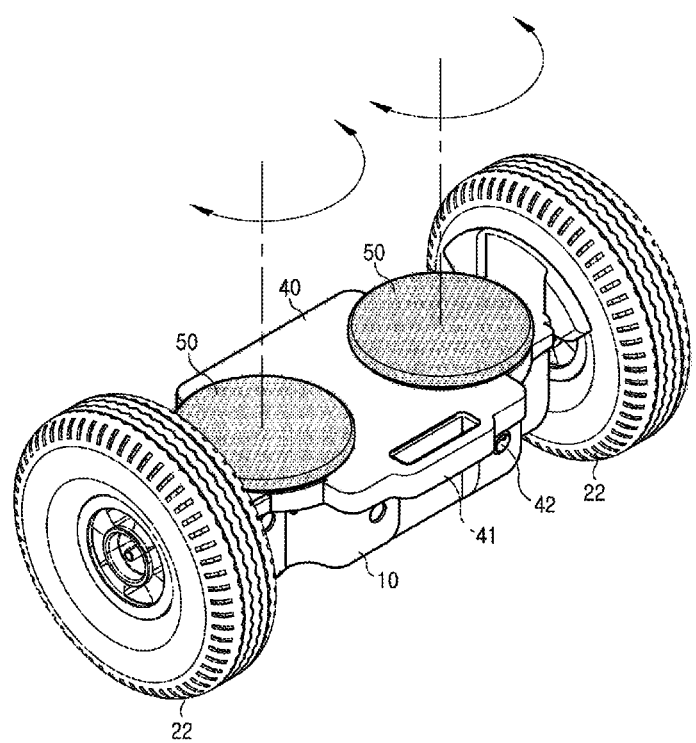
FIG. 3 is a perspective view showing a hands-free balancing scooter steered twistedly with feet according to the present invention.

FIG. 3 is a perspective view showing a hands-free balancing scooter steered twistedly with feet according to the present invention, which is an improvement of the conventional backpack type self-balancing scooter having a foot-driven steering apparatus mounted thereon as shown in FIG. 2, wherein new parts are added to provide higher operating effects than those in the conventional backpack type self-balancing scooter.

As shown in FIG. 3, a hands-free balancing scooter steered twistedly with feet according to the present invention includes a housing 10, two wheels 22 mounted on the left and right sides of the housing 10, a foothold 40 located on top of the housing 10 and having a handle 41 formed thereon, and two turntables 50 mounted spaced apart from each other by a given distance on the foothold 40 so as to conduct direction changes of the scooter, wherein a rider steps on the two turntables 50 and stands upright to drive the scooter, while maintaining a natural distance between his or her both feet.

Figure 8:
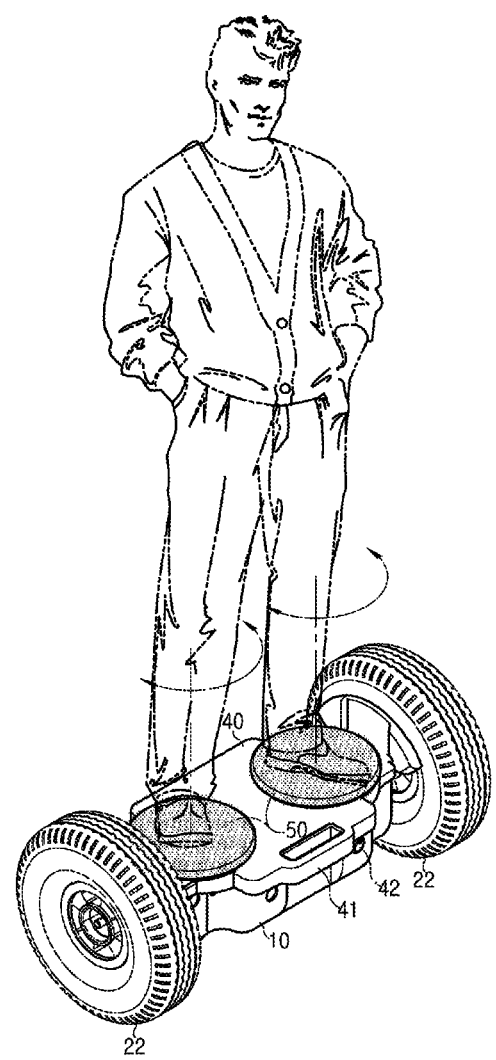
FIG. 8 is a perspective view showing the use state of the hands-free balancing scooter steered twistedly with feet according to the present invention.

In the state where the rider steps on the two turntables 50 and stands upright, as shown in FIG. 8, if he or she wants to change the driving direction of the scooter, his or her both feet coming into contact with the turntables 50 are twistedly turned to left and right sides as indicated by the arrows shown in FIGS. 3 and 8, thus changing the driving direction of the scooter.

According to the present invention, the states of the rider's both feet upon the direction changes of the scooter are not different from the states of the rider's both feet upon driving of the scooter. According to the conventional backpack type self-balancing scooter, in more detail, the rider's feet are maintained in the state of being brought into contact with the foothold 40 during the forward and backward driving of the scooter, but the heel of the foot stepped on the shuttle ring 80 should be raised upon the direction changes of the scooter, so that the states of the rider's both feet upon the forward and backward driving are different from the states of the rider's both feet upon the direction changes. Therefore, his or her both feet become unbalanced, and unfortunately, his or her psychological balancing becomes lost, thus making it hard to drive the scooter.

However, his or her both feet coming into contact with the turntables 50 have the same states as each other upon the forward and backward driving as well as the direction changes of the scooter, thus allowing him or her to stably drive the scooter technologically and psychologically.

Figure 4:
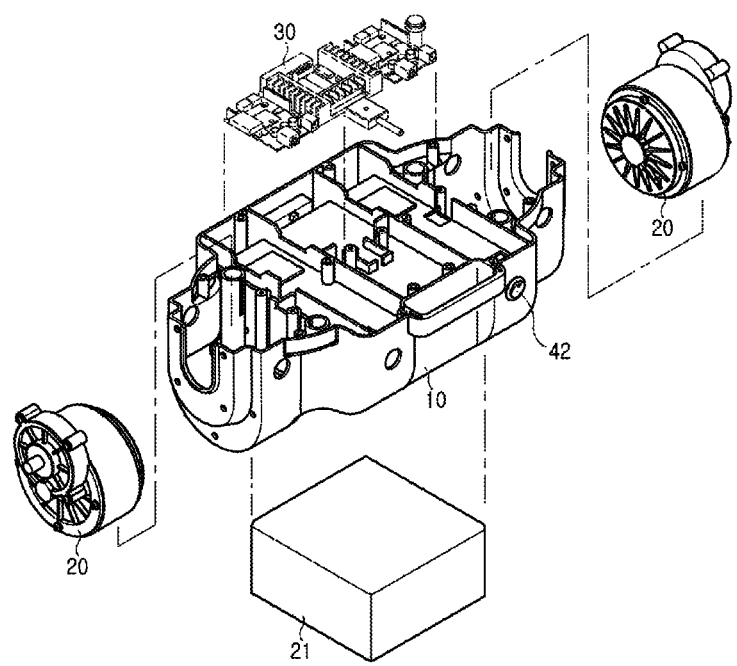
FIGS. 4 and 5 are exploded perspective views showing a housing of the hands-free balancing scooter according to the present invention.
Figure 5:
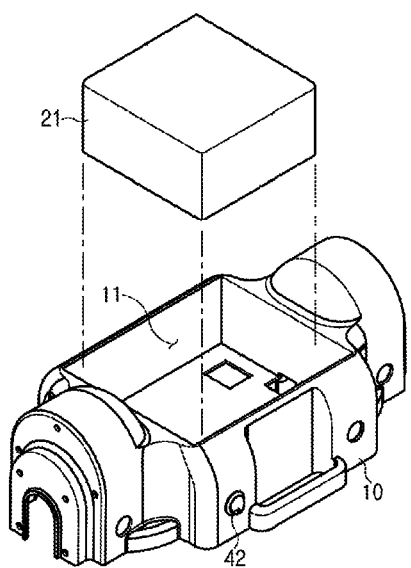

FIGS. 4 and 5 are exploded perspective views showing a housing of the hands-free balancing scooter according to the present invention. As shown in FIG. 4, the housing 10 has a controller 30 mounted on the upper portion thereof, on which a variety of sensors like a gyro sensor are collected, to control driving and direction changes of the balancing scooter, and motors 20 are mounted on both sides of the housing 10 and have wheels 22 mounted on the shafts thereof.

On the other hand, FIG. 5 shows the housing 10 turned by 180°, and the housing 10 has a battery mounting portion 11 formed on the bottom surface thereof to mount a battery 21 therein. The housing 10 has a switch 42 mounted on one side surface thereof to apply power thereto, and besides, the housing has a plug for charging the battery 21 and a display for displaying the driving state or malfunctions.

Figure 6:
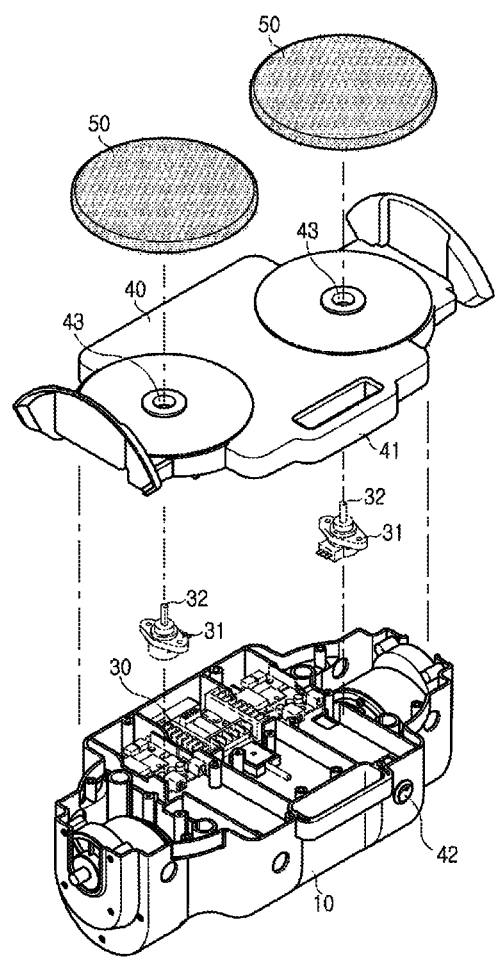
FIG. 6 is an exploded perspective view showing a foothold of the hands-free balancing scooter according to the present invention.
Figure 7:
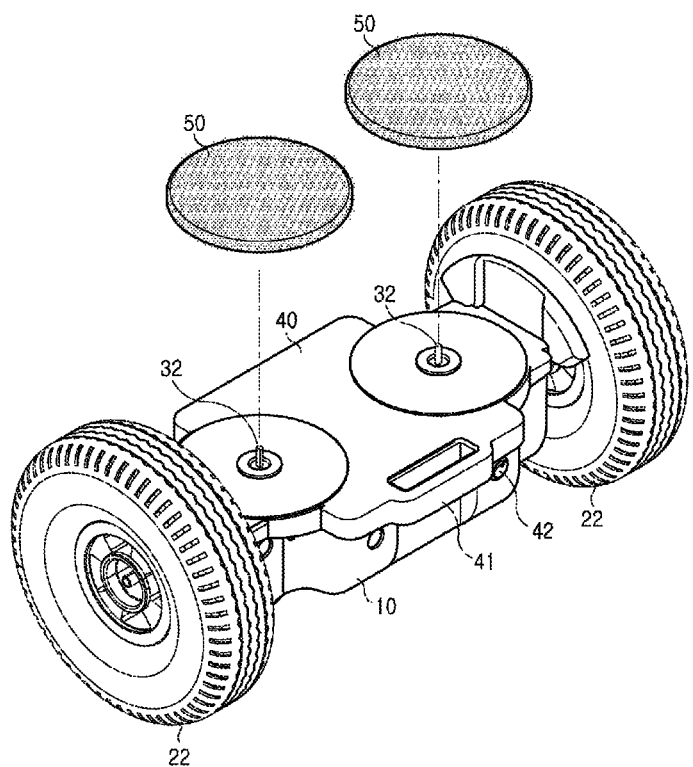
FIG. 7 is an exploded perspective view showing turntables of the hands-free balancing scooter according to the present invention.

FIG. 6 is an exploded perspective view showing a foothold of the hands-free balancing scooter according to the present invention, and FIG. 7 is an exploded perspective view showing turntables of the hands-free balancing scooter according to the present invention. As shown in FIG. 6, the foothold 40 is mounted on top of the housing 10 to step a rider's both feet thereon and has the handle 41 formed on one side thereof so as to easily move the scooter according to the present invention from a road surface on which driving is impossible.

Further, the foothold 40 has two through holes 43 formed thereon to allow manipulating rods 32 of rotary motion sensors 31 embedded into the housing 10 to protrude therefrom, and as shown in FIG. 7, the turntables 50 are mounted on the foothold 40 in such a manner as to allow the centers thereof to be assembled to the manipulating rods 32 of the rotary motion sensors 31. On the other hand, the foothold 40 desirably includes concave and convex portions or a non-slip material formed thereon to generate a frictional force from the soles of the rider's feet, so that he or she can take a stable posture.

FIG. 8 is a perspective view showing the use state of the hands-free balancing scooter twist-steered with feet according to the present invention. As mentioned above, the hands-free balancing scooter steered twistedly with feet according to the present invention is configured wherein the turntables 50 are turned to the left or right sides by using the compressing forces of the rider's both feet stepped thereon if it is desired to change the driving direction of the scooter, and the direction change signals of the turntables 50 are transmitted to the controller 30 mounted in the housing 10 along electric wires, thus permitting the driving direction of the balancing scooter to be changed.

As described above, the hands-free balancing scooter steered twistedly with feet according to the present invention is configured wherein so as to change the driving direction of the scooter, the rider's both feet are kept coming into contact with the turntables 50 in the same manner as during the forward and backward driving, without having any need to raise the heel of his or her one foot, and next, his or her both feet stepped on the turntables 50 twistedly turn to change the driving direction of the scooter, thus preventing the structural and psychological balancing from being lost to allow the forward and backward driving and the change in the driving direction to be stably conducted.

Additionally, the hands-free balancing scooter steered twistedly with feet according to the present invention is configured to a flat shape, while having no fixing shaft 70 erected thereon, so that since the rider's both hands are free, he or she may take a picture, hold objects with his or her hands, or use his or her hands freely. Even if the rider has disabilities in hands, further, the balancing scooter can be driven only with the inclination of his or her body, and also, the turntables 50 are twistedly turned to the left and right sides through his or her both feet stepped thereon to change the driving direction of the scooter, so that the hands-free balancing scooter can be driven easily even by the rider with disabilities in hands, without having any trouble.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A hands-free balancing scooter steered twistedly with feet, comprising:
   a housing 10;
   a controller 30 mounted on an upper portion of the housing 10 to control driving and direction changes of the balancing scooter;
   motors 20 mounted on both sides of the housing 10 and having wheels 22 mounted on shafts of the motors;
   a battery mounting portion 11 formed on a bottom surface of the housing 10 so as to mount a battery 21 in the battery mounting portion;
   a foothold 40 located on top of the housing 10 to allow a rider's both feet to be stepped on the foothold and having a handle 41 formed on one side of the foothold and two through holes 43 formed on the foothold to allow manipulating rods 32 of rotary motion sensors 31 embedded into the housing 10 to protrude from the through holes of the foothold; and
   turntables 50 mounted on the foothold 40 in such a manner as to be assembled to the manipulating rods 32 of the rotary motion sensors 31,
   wherein if it is desired to change the driving direction of the balancing scooter, the rider's both feet twistedly turn the turntables 50 in the state where the rider's both feet are brought into contact with the turntables 50.

* * * * *